Sept. 8, 1931.   W. H. COOK   1,822,763
COLLAPSIBLE DECOY
Filed Nov. 12, 1930
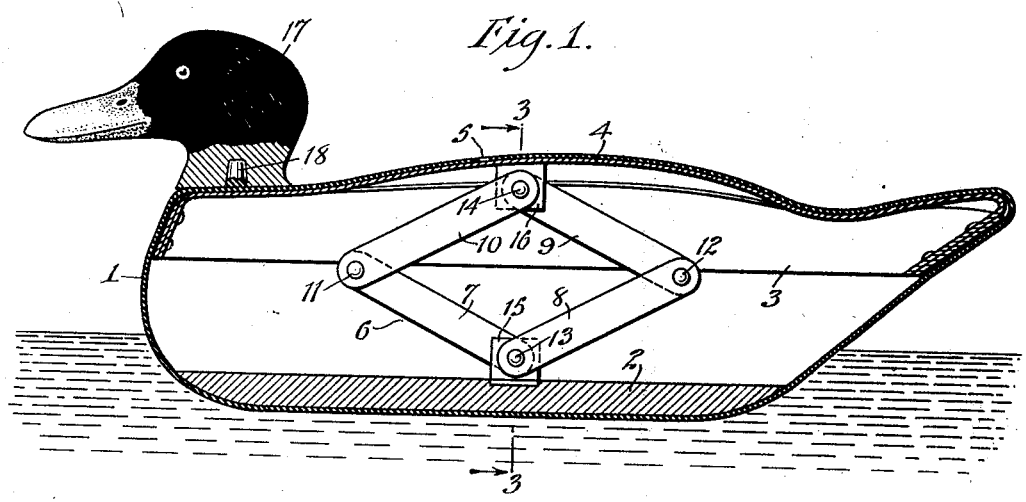
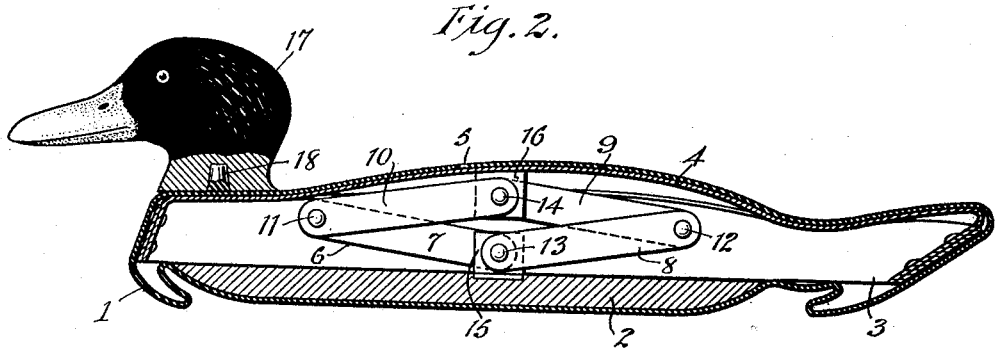
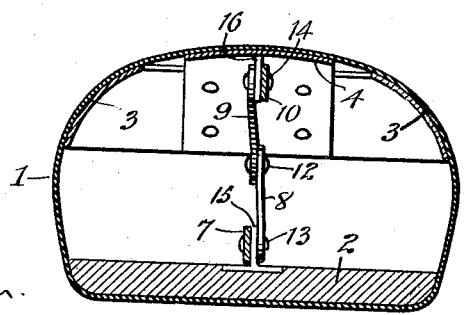
WITNESSES
Edw. Thorpe
A. L. Kitchin
INVENTOR
W. H. Cook
BY Munn & Co.
ATTORNEY Patented Sept. 8, 1931

1,822,763

UNITED STATES PATENT OFFICE

WILDER H. COOK, OF ATHENS, NEW YORK

COLLAPSIBLE DECOY

Application filed November 12, 1930. Serial No. 495,257.

This invention relates to decoys and particularly to decoys for ducks or other fowl, the object being to provide an improved construction whereby the decoy may be collapsed when not in use so as to occupy but a comparatively small space in a boat or other conveyance.

Another object of the invention is to provide a collapsible decoy wherein stiffening members are provided which gives the desired shape, and are arranged so that they may be collapsed without injuring the outer shell or casing.

A further object, more specifically, is to provide a decoy duck formed with a head of conventional shape and also a body of conventional shape when distended, the structure including a top and bottom framework connected by collapsing means adapted to remain in any position in which it is placed so that the decoy will remain either collapsed or distended according to circumstances.

In the accompanying drawings—

Figure 1 is a longitudinal vertical sectional view through a decoy disclosing an embodiment of the invention;

Figure 2 is a view similar to Fig. 1 but showing the parts collapsed;

Figure 3 is a sectional view through Figure 1 approximately on the line 3—3.

Referring to the accompanying drawings by numerals, 1 indicates a body or outer casing. Arranged in the body 1 is a frame which consists of a base 2 and a band 3 and a brace or top bar 4. The base 2 may be of wood, metal or other desired material and is secured by any desired means as, for instance, cement, to the casing or body 1, which casing may be made of rubber, canvas and rubber, or any other waterproof flexible material. The band 3 is preferably of metal although it can be made from celluloid, bakelite, wood or other material. The band 3 is shaped to present the proper contour to the upper part of the decoy including the tail. Riveted or otherwise rigidly secured to the band 3 at its ends is a bar 4 which is shaped to give the desired contour to the center of the back of the decoy. As the body of the casing 1 surrounds the entire frame, and as this body is adapted to collapse as shown in Figure 2, preferably a very small aperture 5 is provided whereby air may escape as the decoy is collapsed and air may enter as the decoy is distended. This aperture is so small that when the decoy is thrown into the water any water splashed thereon will not pass to any noticeable extent through the aperture.

In order to hold the frame either collapsed, as shown in Figure 2, or distended, as shown in Figure 1, a toggle 6 is provided which consists of bars 7, 8, 9 and 10. Bars 7 and 10 are secured together by a rivet 11, while bars 8 and 9 are secured by a rivet 12. These rivets are preferably comparatively tight so that the bars will only move when positive pressure is applied thereto. The same is true with regard to rivets 13 and 14, rivet 13 securing bars 7 and 8 to the bracket 15, while rivets 14 secure bars 9 and 10 to bracket 16. Bracket 15 is secured to the base 2 by any desired means as, for instance, cement, and bracket 16 is secured to bar 4 by any desired means as, for instance, solder or welding.

In order to secure the head 17 in place the same is provided with a suitable aperture which snugly receives the pin 18. The head 17 is shown as a duck's head in the drawings, but if the decoy is for some other fowl the head may be correspondingly shaped and also the body, although the frame and other parts will be identical in principle. By providing a tight fit between the head 17 and the pin 18 the head is properly held in place but may be removed if desired.

In connection with the body 1, the same may be connected to the band 3 and the bar 4 in any desired manner as, for instance, by rivets, cement, or other securing means. Under some circumstances the frame is not secured to the body 1, but is merely arranged interiorly thereof, and when extended brings the body under tension so that a properly formed body of the fowl will be provided, as shown in Figure 1.

What I claim is—

1. A collapsible decoy including a flexible body, a frame structure arranged in said body and formed with top and bottom members, and a toggle positioned in the frame for connecting the top and bottom members.

2. A collapsible decoy comprising a flexible body provided with a head, a frame arranged interiorly of the body provided with a base at the bottom part, a band near the upper part, a bracing bar at the center of the upper part, said band and bar being connected together, and a toggle held in place by friction, said toggle connecting the base with said bar.

3. A collapsible decoy including a flexible body having a head, and collapsible means arranged interiorly of the body for holding the body in collapsed and distended position, said means including a toggle structure with the pivotal members acting in a double capacity as pivotal pins or clamps for producing friction between the various links of the toggle so that the toggle and body will remain in any position in which it is placed, said toggle being permanently connected at two points with the body.

4. A collapsible decoy including a flexible body including a head, means including a fractionally held toggle holding said body either distended or collapsed.

5. A collapsible decoy including a flexible body of waterproof material provided with a head, a frame arranged in said body provided with a base extending longitudinally of the body, a band arranged at the upper part and extending to near the tip of the tail of the decoy, a bar riveted to said band and extending from the front of the decoy to the extreme tip of the tail thereof, a bracket carried by said bar substantially central thereof, a bracket carried by said base substantially central thereof, and a frictionally held toggle connected with said brackets.

6. A collapsible decoy including a flexible body, a rigid head, a rigid structure arranged at the top of the body interiorly thereof, a rigid structure arranged at the bottom of the body interiorly thereof, and means connected to said rigid structures including a toggle for holding said body either distended or collapsed, said toggle having its members held by friction in the different positions to which they are moved, so that the body is held through the action of friction in a distended or collapsed position.

WILDER H. COOK.